INVENTORS
WILLIAM H. LYON
LOUIS E. NAGY
BY
H. G. Manning
ATTORNEY

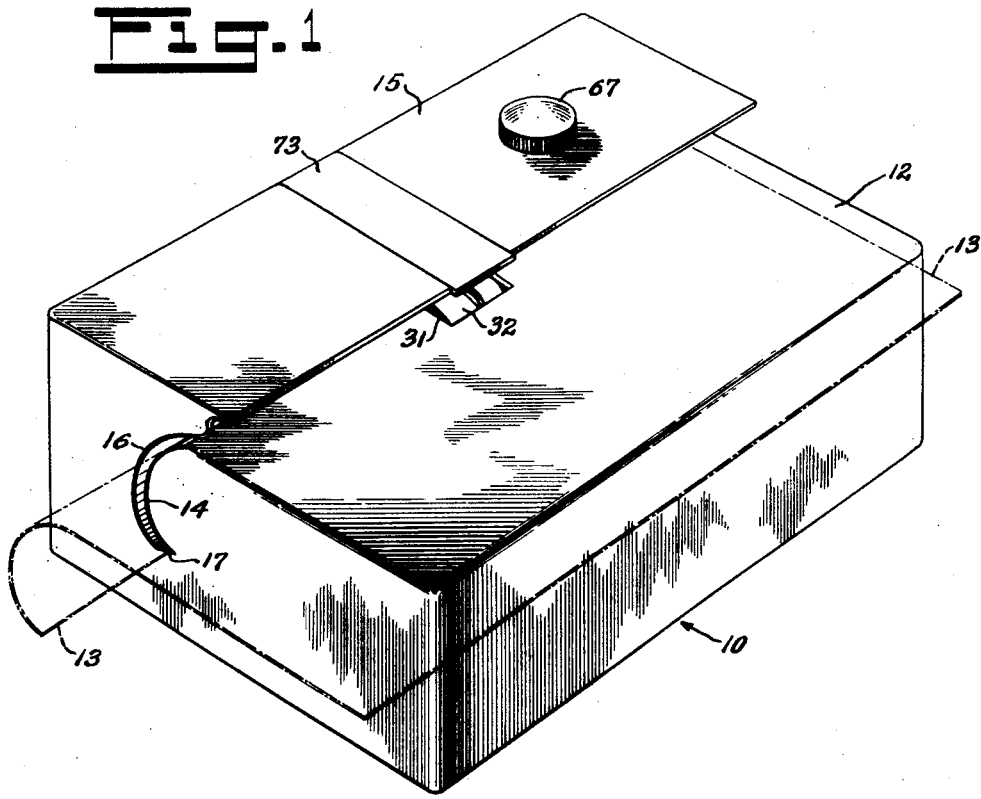
Fig. 1
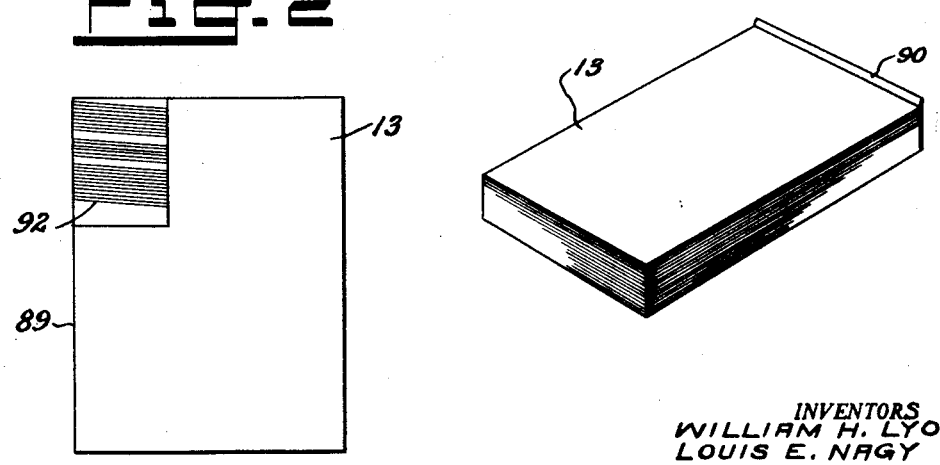
Fig. 2
Fig. 3
INVENTORS
WILLIAM H. LYON
LOUIS E. NAGY
BY
H. G. Manning
ATTORNEY Dec. 1, 1959 W. H. LYON ET AL 2,915,596
COATED SHEET MAGNETIC RECORDER
Filed Dec. 19, 1955 5 Sheets-Sheet 2

Dec. 1, 1959 W. H. LYON ET AL 2,915,596
COATED SHEET MAGNETIC RECORDER
Filed Dec. 19, 1955 5 Sheets-Sheet 3

INVENTORS
WILLIAM H. LYON
LOUIS E. NAGY
BY
H. G. Manning
ATTORNEY

Dec. 1, 1959    W. H. LYON ET AL    2,915,596
COATED SHEET MAGNETIC RECORDER
Filed Dec. 19, 1955    5 Sheets-Sheet 4
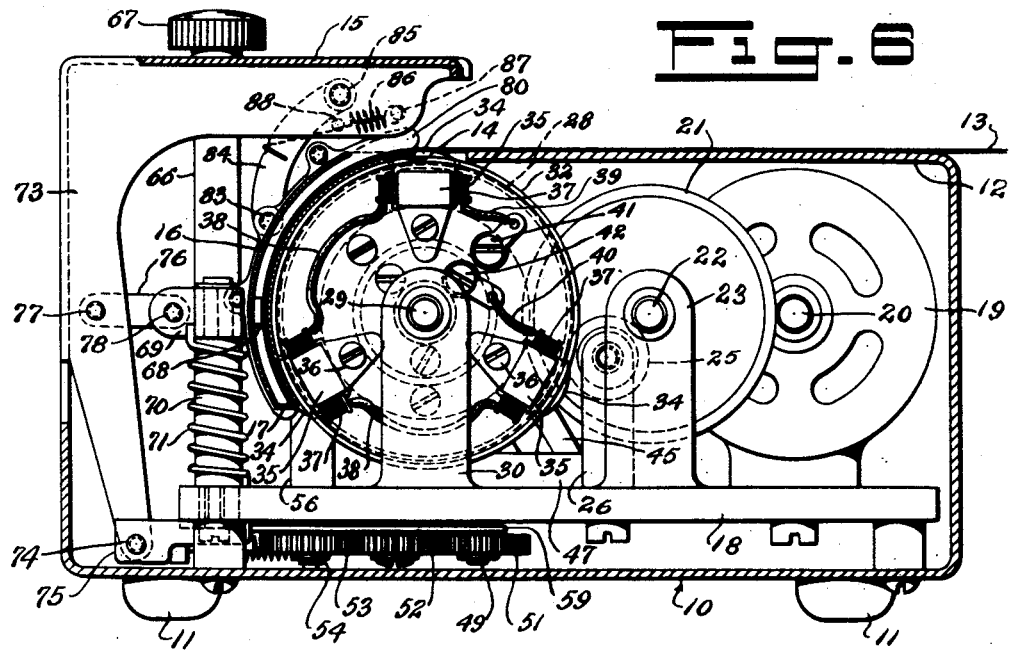
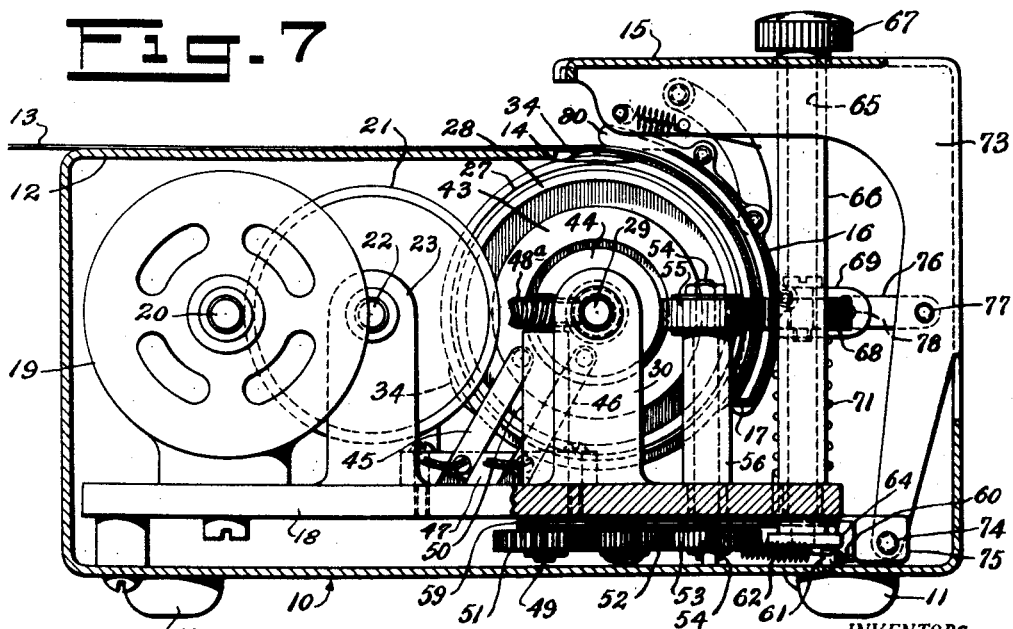
INVENTORS
WILLIAM H. LYON
LOUIS E. NAGY
BY
H. G. Manning
ATTORNEY

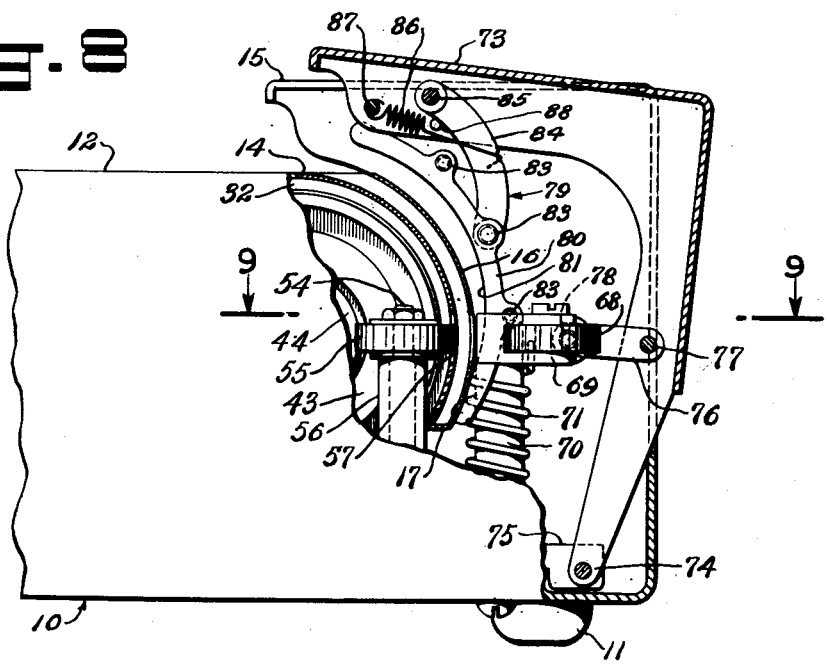
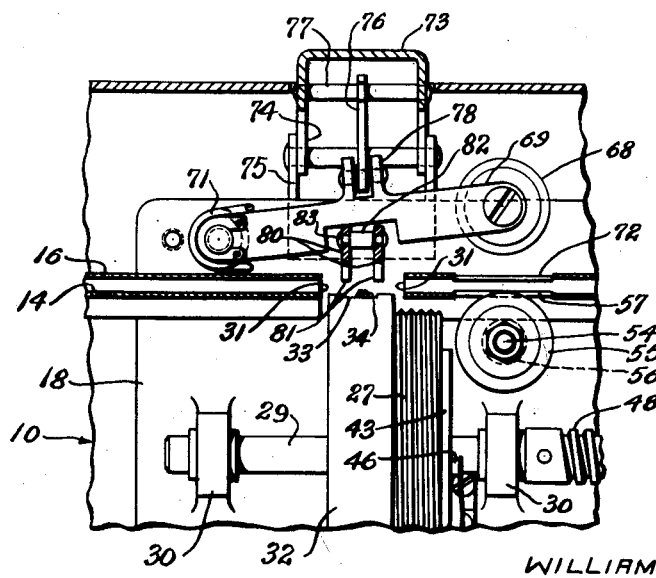

United States Patent Office 2,915,596
Patented Dec. 1, 1959

2,915,596

COATED SHEET MAGNETIC RECORDER

William H. Lyon, Orange, and Louis E. Nagy, New Haven, Conn., assignors to The Soundscriber Corporation, New Haven, Conn., a corporation of Connecticut Application December 19, 1955, Serial No. 553,953

9 Claims. (Cl. 179—100.2)

This invention relates to a recording and reproducing apparatus and more particularly to means for recording intelligence on a sheet of paramagnetic material.

One object of this invention is to provide an apparatus of the above nature whereby a sheet of paramagnetic material which is suitable for the receipt of visual intelligence such as written or printed material may also receive intelligence recorded by magnetic means.

A further object is to provide a device of the above nature capable of scanning a sheet, a portion of said sheet along one of the margins thereof being paramagnetic in nature, said device having means to feed the sheet in a direction parallel to said margin and to move transducer means in a transverse direction with respect to said movement of the sheet, in order to magnetically record intelligence in or transcribe intelligence from said paramagnetic portion of the sheet.

Still another object is to provide a magnetic recording apparatus of the type, wherein rotating transducer means is provided to scan a sheet of paramagnetic material which is moved in a direction at right angles to the path of the transducer means, and wherein said sheet of paramagnetic material may be inserted into or removed from the apparatus in a direction other than the normal path of travel of said sheet.

A still further object is to provide a magnetic recording apparatus whereby comparatively short lengths of paramagnetic sheets may be scanned by a transducing means to provide a series of transverse paths of continuously recorded intelligence thereon.

A further object is to provide a device of the above nature which will be simple in construction, inexpensive to manufacture, easy to install and manipulate, compact, ornamental in appearance, and very efficient and durable in use.

With these and other objects in view, there has been illustrated on the accompanying drawings, one form in which the invention may conveniently be embodied in practice.

In the drawings,

Fig. 1 represents a perspective view of one form of paramagnetic sheet recorder embodying the present invention.

Fig. 2 is a plan view of the reverse side of one form of paramagnetic sheet which may be used with the above apparatus.

Fig. 3 is a perspective view of a pad of paper sheets, each of which has been treated to give it a paramagnetic quality for use with the above apparatus.

Fig. 6 is a cross-sectional side elevation, taken on the line 6—6 of Fig. 4.

Fig. 7 is a cross-sectional elevation, taken on the line 7—7 of Fig. 4.

Fig. 8 is a fragmentary end view of the apparatus, with one corner cut away to show the operation of the loading arm.

Fig. 9 is a cross-section taken on the line 9—9 of Fig. 8.

Figure 4:
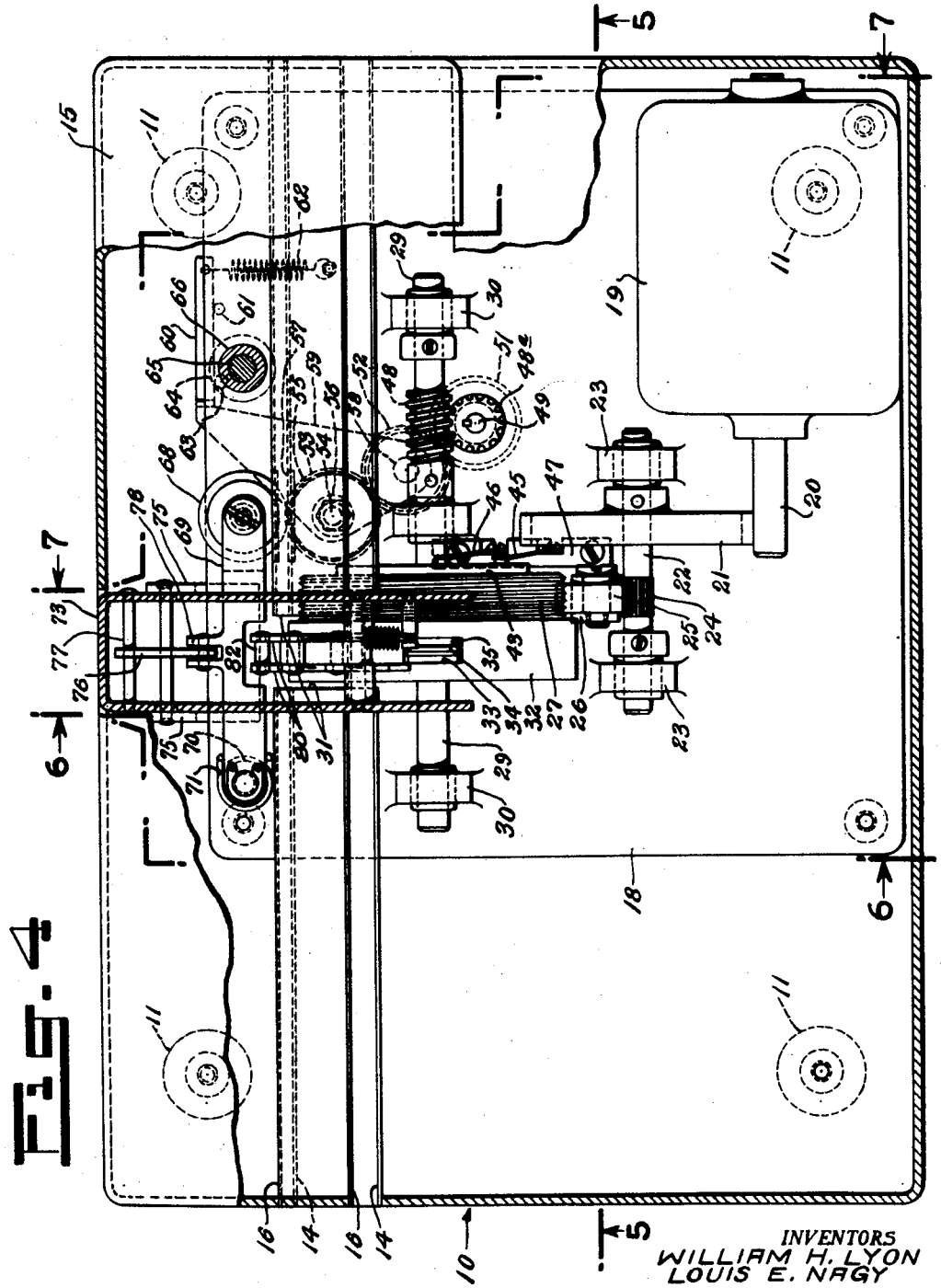
Fig. 4 is a plan view of the apparatus shown in Fig. 1, with a portion of the cover cut away.
Figure 5:
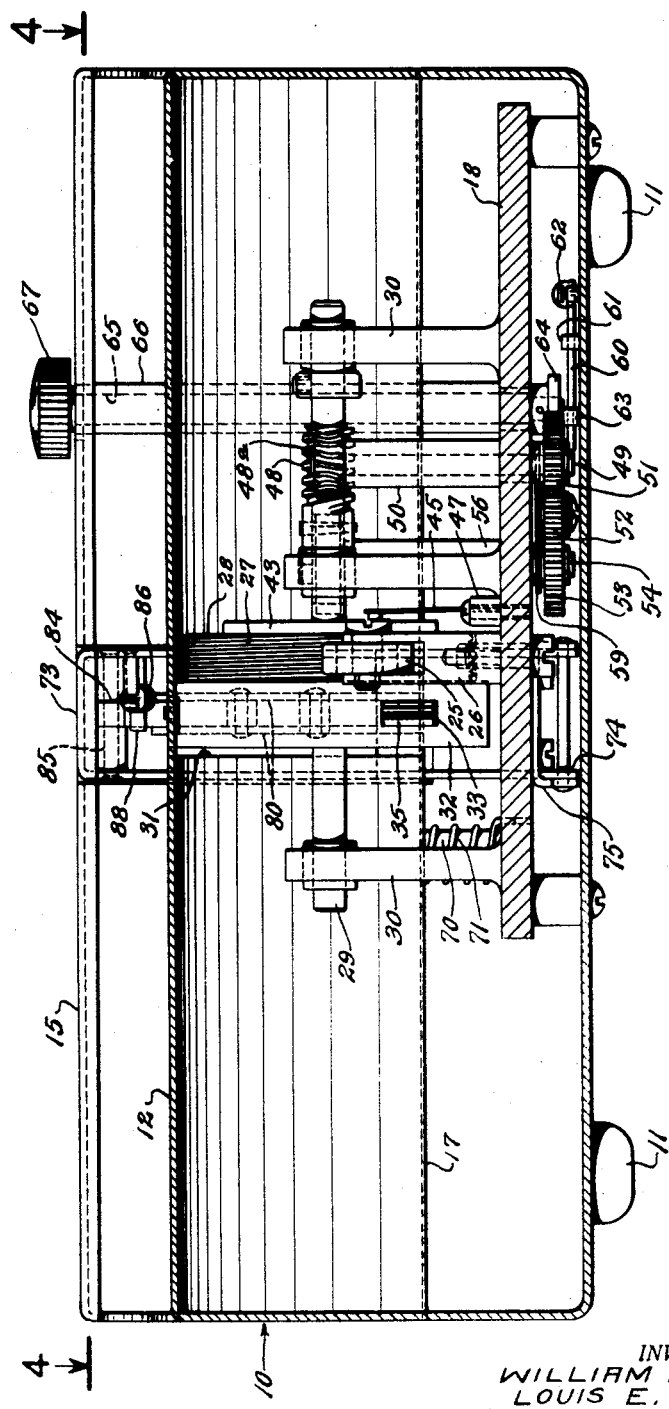
Fig. 5 is a cross-sectional elevation of the same, taken on the line 5—5 of Figure 4.

Referring now to the drawings in which like reference numerals denote corresponding parts throughout the several views, the numeral 10 indicates a cabinet generally, having a plurality of cushioning feet 11, within which the operating mechanisms of the device are contained.

A portion of the top of the cabinet 10 forms a loading shelf 12 for a wide sheet 13 of paramagnetic material on which intelligence is to be magnetically recorded as will hereinafter be explained.

The loading shelf 12 extends horizontally from one side of the cabinet to the other, and from the front of the cabinet part way to the rear thereof where it merges with a downwardly extending cylindrical surface 14.

Extending forwardly from the rear of the cabinet 10 is a flat cover 15 which overhangs the rear edge of the loading shelf 12. Also extending downwardly and rearwardly from underneath the cover 15, is an arcuate surface 16 generally parallel to and spaced from the cylindrical surface 14 and to which it is joined at its lower end along a horizontally extending straight guide line indicated by the numeral 17. The horizontally extending arcuate slot defined by the surfaces 14 and 16 serves to support a portion of the paramagnetic sheet material 13 used with the apparatus, and the guide line 17 along which these surfaces meet forms a reference stop for one margin of said sheet.

Included within the cabinet 10 are transducing means for impressing intelligence on and reproducing it from a sheet of paramagnetic material, means to feed the material through the apparatus and amplifying means (not shown).

The preferred form of transducing means and sheet feeding means is shown mounted on a chassis plate 18.

Power to drive the various mechanisms is furnished by an electric motor 19 having a stub shaft 20 positioned for frictional engagement with an idler wheel 21, the outer surface of which is formed of some rubber-like material.

The idler wheel 21 is fixed to a shaft 22 which is suitably mounted in bearing mountings 23 for rotation about a horizontal axis. A portion of the idler shaft 22 is knurled as at 24 (Fig. 4) in order to provide suitable frictional engagement between the shaft 22 and a head wheel driving puck 25, which also is formed of some suitable material such as rubber, and is rotatably supported on a pair of stanchions 26 so as to be placed in driving engagement with a spirally grooved head wheel driving surface 27 which extends axially from one side of a disk shaped member 28 fixed on a head shaft 29. The head shaft 29 is supported by a pair of journalled mountings 30 so that its axis will be disposed concentrically with respect to the axis of the cylindrical surface 14, the central portion of which, and a portion of the loading shelf 12, are cut away as at 31 to provide a vertically extending slot into which the cylindrical shell 32 of the head wheel projects, the radius of said shell being the same as the radius of the cylinder of curvature defined by the surface 14.

The shell 32 is attached to and extends axially from the side of the disk-shaped member 28 which is opposite to that of the driving surface 27.

Equidistantly spaced circumferentially about the surface of the shell 32 are three slotted openings 33 through which project the pole pieces 34 of the magnetic transducer heads 35 which are attached to the disk-shaped member 28 by any suitable means, such as screws 36. Coil windings 37 of the transducer heads 35 are connected in series by means of wires 38 terminating in lead-in wires 39 and 40 provided with suitable lugs for attachment to screws 41 and 42 respectively which extend through suitably insulated openings in the member 28 and threadedly received in concentrically disposed slip rings 43 and 44 (Fig. 7) respectively, mounted on the other side of the member 28 and suitably insulated therefrom.

Brushes 45 and 46 are mounted on the insulated block 47 attached to the chassis plate 18 for electrical contact with the slip rings 43 and 44 respectively.

The head shaft 29 is also provided with a worm 48 which is in driving engagement with a gear 48a attached at one end of a shaft 49 which is supported for rotation about a vertical axis in a housing 50 which extends upwardly from the chassis plate 18. Attached at the lower end of the shaft 49 is a gear 51 which meshes with a tuning gear 52 which in turn drives a gear 53 attached to the lower end of a shaft 54, at the upper end of which is attached a feed roller 55 supported for rotation about a vertical axis on a housing 56 which extends upwardly from the chassis plate 18.

The cylindrical surface 14 is provided with a horizontally extending slot 57 and the feed roll 55 is positioned by the housing 56 so that the periphery of said feed roll 55 will project slightly into the space between the arcuate surfaces 14 and 16 in order to come in contact with the sheet material to be fed thereby.

The arrangement of the gearing just described is such that a proper relationship will be established between the movement of paramagnetic sheet material driven lengthwise through the arcuate guide channel formed by the surfaces 14 and 16 by the feed roller 55 and the transverse movement of the transducer heads 35 across the sheet material during rotation of the head shaft 29, and is generally similar to an arrangement disclosed and claimed in the copending application of William H. Lyon, Serial No. 406,517, filed January 27, 1954, entitled "Transverse Interrupted Track Magnetic Recorder With Transducer Head Drum on Horizontal Axis."

As a result, each of the transducer heads 35 will scan a path across the sheet material which is spaced, with respect to the direction of movement of the sheet, from the path produced by the preceding transducer head and the path produced by the following transducer head.

A phase relationship is thereby established between the lengthwise movement of the sheet of paramagnetic material and the transverse movement of the transducer head which must necessarily be reestablished whenever it is desired to reproduce intelligence from said sheet on which the transverse magnetic paths have already been recorded therein.

For this purpose, the tuning gear 52 is rotatably supported on a stub shaft 58 (Fig. 4) which is attached to a flat tuning plate 59. The tuning plate 59 is itself pivotally supported at the lower end of the shaft 54 and is provided with an outwardly extending actuating arm 60. Movement of the tuning plate 59 in one direction is limited by a stop member 61 against which the actuating arm 60 is normally urged by a coil spring means 62. A pin 63 is eccentrically mounted on a disk 64 fixed on the lower end of a shaft 65 which is rotatably mounted in a housing 66 and extends vertically up through the cover 15 to receive a tuning knob 67.

A pressure roller 68 provides positive driving engagement between the feed roller 55 and a sheet of material to be fed thereby.

The pressure roller 68 having its surface preferably formed of some soft yieldable material such as rubber, is rotatably mounted on a vertical axis at one end of an arm 69 which is in turn pivotally mounted on a pedestal 70, for swinging movement about a vertical axis. A coil spring 71 encircles the pedestal 70, one end of the spring being anchored to the chassis plate 18, the other end of the spring bearing against the arm 69 so as to urge the pressure roller 68 towards the feed roller 55.

A horizontally extending slot 72 is provided in the arcuate surface 16 to permit engagement between the pressure roller 68 and the feed roller 55.

Midway of the sides of the cabinet 10, the cover 15 and a portion of the back of the cabinet is divided, to permit the inclusion of a generally L-shaped loading arm 73 which is pivotably supported at its lower end 74 on a bracket 75 attached to the chassis plate 18 to permit swinging movement of the loading arm 73 about a horizontal axis.

A retracting link 76 is loosely carried on a pin 77 attached to the loading arm 73, the other end of said link 76 having a floating pivotal connection 78 with the arm 69, so that when said arm 73 is swung backwardly from the cabinet 10, the retracting link 76 will move the pressure roller 68 out of contact with the feed roller 55 (Fig. 9).

In order to secure intimate contact between the paramagnetic sheet material 13 and the rotating transducer heads 35, provision is made of yieldable pressure shoe means 79 (Fig. 8). This shoe means includes a pair of flat arcuately elongated members 80, the inner surfaces 81 (see Figs. 8 and 9) of which are accurately shaped to conform to the cylindrical surface of the head wheel 32.

To assure continuity of the magnetic track impressed in the sheet material 13, the members 80 should extend over a portion of an arc which is slightly greater than the circumferential distance between successive transducer heads 35. The members 80 are preferably assembled in side-by-side relationship separated by spacers 82 through which fastening means, such as rivets 83 may be inserted. One of the spacers 82, positioned midway between the ends of the members 80, may also serve as a pivotal connection between the members 80 and one end of an arm 84, the other end of said arm being pivotally supported on a pin 85 which is inserted horizontally in the loading arm 73.

The pressure shoe means 79 is normally held against the head wheel shell 32 under slight pressure by means of a coil spring 86, one end of which is attached to a pin 87 in the loading arm 73, and the other end of which is connected to the arm 84. In order to limit the forward movement of the arm 84 when the loading arm 73 is swung backwardly, provision is made of a stop pin 88 (Fig. 8).

*Operation*

Preferably, the sheet 13 will be composed of ordinary paper coated on the reverse side with a fine deposit of magnetic particles. The front side of the sheet may be a printed business form upon which information is to be written or typed, but it will be understood that the entire surface of the sheet 13 need not be treated with paramagnetic material, but only the area extending inwardly from one of the margins 89, a distance which should be at least equal to the width of the paths 92 which will be traversed by the transducing heads 35.

For convenience a plurality of sheets 13 may be assembled in a tablet or pad having an adhesive binding 90 at one end as shown in Fig. 3.

It will be understood that in practice if the apparatus herein described is to be used for the recording and reproducing of sound, a suitable electrical amplifier (not shown) will be included within the cabinet 10, said amplifier having connections for a microphone and sound reproducing apparatus.

Whenever it is desired to record sound on a sheet of material 13, the first step will be to lift the front of the loading arm 73 which will automatically pull back the pressure shoe means 79 together with the pressure roller 68 to permit the insertion of the sheet 13 in the guide channel formed by the arcuate surfaces 14 and 16. If the sheet 13 is provided with a magnetic coating on one side, such as the reverse side, said sheet will be placed on the loading shelf 12 with its reverse side down and with the leading edge of the magnetic coating substantially in alignment with the shell 32 of the head wheel.

The sheet 13 will be pushed downwardly into the guide channel until the margin 89 is in contact with the guide stop 17 along its entire length. The loading arm 73 will then be returned to its original position as shown in Fig. 1, which will bring the pressure roller 68 in contact with the surface of the sheet so as to hold it firmly against the surface of the feed roller 55, and will maintain the pressure shoe means 79 in position to maintain contact between the sheet 13 and the individual pole pieces 34 of the transducer heads 35. A suitable switch (not shown) may be provided for starting and stopping the motor 19. When current is supplied to the motor 19, rotation of the shell of the head wheel 32 will take place in a clockwise direction as viewed in Fig. 7 causing the transducer heads 35 to scan the portion of the sheet 13 which lies under the pressure shoe 79. At the same time, the feed roller 55 will move the sheet 13 longitudinally with respect to the guide stop 17 toward the right as viewed in Fig. 4.

The net result of this movement of the sheet 13 combined with the transverse movement of the transducer heads will cause a series of magnetic paths 92 to be created in the magnetic coating of the sheet 13. Each of the successive transducer heads 35 will create a separate path 92 which is spaced from and parallel to the path created by the preceding head 35—there being a slight overlap of the recording produced at the beginning and the end of each separate path. Whenever it is desired to remove the sheet 13 from the apparatus, this may be done by lifting the loading arm 73.

In the case of a sheet 13 which has received a recorded message and from which it is desired to reproduce said recorded intelligence, the sheet 13 will be inserted into the machine by lifting the loading arm 73 and pushing the sheet 13 down into the guide channel until the margin 89 bears against the guide stop 17. In this case, the sheet 13 will be positioned longitudinally with respect to the guide stop 17 so as to bring the beginning of the recorded portion into alignment with the transducer heads 35.

However, it will first be necessary to adjust the phase relationship between the individual transducer heads 35 and the feed roller 55 to prevent the transducer heads scanning the sheet 13 along paths which are out of alignment with the paths 92 originally impressed on the sheet 13. The proper phase relationship may be reestablished by rotation of the tuning knob 67, in one direction or the other, which will cause a slight rotation of the tuning plate 59 carrying the tuning gear 52 about the shaft 54. This shifting of the axis 58 of the tuning gear 52 with respect to the axis 49 of the gear 51 and the axis 54 of the gear 53 will shift the longitudinal point at which each successive transducer head 35 enters the area covered by the paths 92.

Once this phase relationship has been established it will not usually be necessary to make any further adjustment of the tuning knob 67. It should also be noted that due to the frictional engagement between the sheet material 13 and the successive magnetic transducer heads 35 caused by the pressure of the shoe 79 a force will be exerted on the sheet material 13 tending to urge it downwardly into the guide channel between the surfaces 14 and 16. This movement will be limited by the engagement of the margin 89 of the sheet 13 with the guide stop 17.

The proper alignment of the margin 89 with the guide stop 17 will automatically be established upon rotation of the shell 32 of the head wheel.

Furthermore it should also be understood that while it is preferred to provide a magnetic coating on the side of the sheet which is to be placed in the apparatus in direct contact with the transducer heads 35, the use of the apparatus is not to be confined to such types of sheet material within the spirit and scope of this invention.

Moreover, the paramagnetic sheet material 13 may be composed wholly or in part of some material having a magnetic quality, or said sheet 13 might comprise laminations of magnetic and non-magnetic material wherein the magnetic material would not necessarily be exteriorly disposed.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. In an apparatus for recording and reproducing intelligence with paramagnetic sheet material having at least one straight margin, the combination comprising a shelf to support a sheet of said material, said shelf comprising a semi-cylindrical portion terminating along one edge in abutment stop means to slidably engage said straight margin to guide said sheet of material for slidable movement on said shelf in a direction parallel to said margin, magnetic transducer means positioned to affect or be affected by said sheet during said movement, means to move said sheet along said shelf, and means including said transducer means to maintain said one margin in operative engagement with said stop abutment means during the movement of said sheet along said shelf.

2. The invention as defined in claim 1, wherein said magnetic transducing means comprises a transducer head rotatable in a circular path concentric with the axis of said semi-cylindrical supporting shelf portion and in the direction of said stop abutment means.

3. The invention as defined in claim 2, wherein said stop abutment means includes a flange extending longitudinally of said semi-cylindrical portion of the supporting surface, and wherein said transducer head is positioned to frictionally engage said sheet of paramagnetic material, whereby rotation of said transducer head is effective to urge said one margin of the paramagnetic sheet material into slidable engagement with said flange.

4. In an apparatus for recording on and reproducing from paramagnetic sheet material of the character described, the combination including feed means to move said sheet material in one direction, transducer means movable in an arcuate path transverse to the direction of the movement of the sheet to affect or be affected by said sheet material, means to hold the sheet material in operative engagement with said transducer means during movement in said transverse arcuate path, said feed means and said holding means being releasable to permit insertion and removal of said sheet material, means to control operation of said feed means and said holding means jointly said feed means including a pressure roller mounted on an arm swingable toward and away from a feed roller, said means to control the operation of said feed means and said holding means including a pivotally mounted loading arm, and floating linkage means connecting said feed means and said loading arm.

5. The invention as defined in claim 4, wherein said holding means includes a pressure shoe movable toward or away from said transducer means.

6. In a recording and reproducing apparatus for use with paramagnetic sheet material having at least one straight margin, the combination including cabinet means, transducing means for the recording and reproducing operation contained in said cabinet means, said cabinet means being provided with an interiorly directed longitudinally extending semi-cylindrical guide channel to receive said sheet material, said transducing means including a transducer head movable in a path corresponding to an arc of said guide channel, said guide channel terminating in a straight guide stop member to slidably engage said one margin of said sheet material, and means to feed said sheet material in a direction parallel with said guide slot.

7. The invention as defined in claim 6, wherein said cabinet means is provided with a horizontally extending flat surface, and said guide channel extends downwardly along one side of said flat surface.

8. The invention as defined in claim 7, wherein said cabinet means includes a cover portion overhanging said guide channel, and an exteriorly positioned member movable to releaseably engage said feed means with respect to a sheet of material received in said guide channel.

9. The invention as defined in claim 8, wherein said transducing means includes a pressure shoe to engage said sheet material, and said exteriorly positioned movable member is adapted to releasably actuate said pressure shoe.

References Cited in the file of this patent

UNITED STATES PATENTS

| | | |
|---|---|---|
| 2,245,286 | Marzocchi | June 10, 1941 |
| 2,603,006 | MacChesney | July 15, 1952 |
| 2,668,718 | Roberts | Feb. 9, 1954 |
| 2,677,200 | MacChesney | May 4, 1954 |